United States Patent [19]

Tsuchiya et al.

[11] Patent Number: 5,177,664
[45] Date of Patent: Jan. 5, 1993

[54] GAS INSULATED SWITCHGEAR

[75] Inventors: Kenji Tsuchiya; Minoru Sakaguchi, both of Hitachi; Hiroshi Suzuyama, Hitachiota, all of Japan

[73] Assignee: Hitachi, Ltd., Tokyo, Japan

[21] Appl. No.: 564,073

[22] Filed: Aug. 8, 1990

[30] Foreign Application Priority Data

Sep. 18, 1989 [JP] Japan .................................. 1-240180

[51] Int. Cl.⁵ ............................................ H02B 1/20
[52] U.S. Cl. .................................. 361/341; 361/335; 361/361; 361/355
[58] Field of Search ............... 361/333, 335, 341, 355, 361/361; 307/147, 148; 200/50 AA, 48 R

[56] References Cited

U.S. PATENT DOCUMENTS

| | | | |
|---|---|---|---|
| 4,209,821 | 6/1980 | Kobayashi et al. | 361/341 |
| 4,215,256 | 7/1980 | Sakaguchi et al. | 200/148 D |
| 4,745,522 | 5/1988 | Mitomo et al. | 361/341 |
| 4,829,400 | 5/1989 | Enomoto | 361/341 |
| 4,890,193 | 12/1989 | Tsubaki | 361/341 |
| 4,967,307 | 10/1990 | Itou et al. | 361/335 |
| 5,001,599 | 3/1991 | Itou et al. | 361/333 |

FOREIGN PATENT DOCUMENTS 60-183908  9/1985  Japan .

Primary Examiner—Leo P. Picard
Assistant Examiner—Bot L. Ledynh
Attorney, Agent, or Firm—Antonelli, Terry, Stout & Kraus

[57] ABSTRACT

The present invention provides a three-phase lumped together gas insulated switchgear, which is small-sized and simply constructed, including main busbar conductors and disconnectors connected to the main busbar conductors. In the gas insulated switchgear, phases of the main busbar conductors are respectively disposed on the vertexes of a triangle. Further, the axes of the disconnectors and disconnector movable side conductors, both of which correspond to three phases, are arranged between one phase of the main busbar conductor and the other two phases of the main busbar conductors so that the axes of the disconnectors for the busbars become parallel with each other. Furthermore, the movable side conductors are connected to the main busbar conductors. Because of the above construction, a circuit breaker and the busbars can be linked within the shortest possible distance to the disconnectors arranged between the circuit breaker and the busbars.

17 Claims, 4 Drawing Sheets

GAS INSULATED SWITCHGEAR

BACKGROUND OF THE INVENTION

1. Field of the Invention

The present invention relates to a gas insulated switchgear, and more particularly to a three-phase lumped together gas insulated switchgear in which three-phase disconnectors, grounding switches, and busbars or transmission line side conductors are housed in a common sealed vessel.

2. Description of the Related Art

Generally, high-voltage class substations are built in the suburbs of large cities, and it is desirable to miniaturize them due to skyrocketing land prices in recent years. To this end, the substations of this type can be miniaturized by constructing them by using gas insulated switchgears and by lumping three phases together. Miniaturization of the substations can also be accomplished by housing a plurality of equipment items in a common sealed vessel.

A three-phase lumped together gas insulated switchgear in such a substation according to the conventional art will now be described with reference to FIG. 6, which is a front view showing the construction of the conventional art.

In FIG. 6, reference characters 30b, 31b, and 35b denote disconnectors; reference characters 32b, 33b denote main busbars; 34b denotes a circuit breaker; and 36b denotes a container for housing cable heads.

The conventional art illustrated in FIG. 6 is a gas insulated switchgear using two three-phase main busbar disconnectors and one three-phase transmission line side disconnector.

Disconnectors 30b, 31b are connected to the circuit breaker 34b and the main busbars 32b, 33b in FIG. 6, and then the disconnectors 30b, 31b are housed in sealed vessels which are positioned above the main busbars 32b, 33b, these sealed vessels being separated from other sealed vessels in which the main busbars 32b, 33b are housed. The axes of the disconnectors 30b, 31b are arranged so as to be disposed on vertexes of a triangle. The gas insulated switchgear having such a structure is disclosed in Japanese Patent Unexamined Publication No. 62-2804.

SUMMARY OF THE INVENTION

An object of the present invention is, in order to miniaturize a gas insulated switchgear which occupies a considerable installation floor area of a substation area, to provide a small-sized and simply constructed gas insulated switchgear which can link within the shortest possible distance a circuit breaker and busbars to disconnectors arranged between them, and which can link within the shortest possible distance the circuit breaker and transmission line side conductors to the disconnectors arranged between them.

According to the present invention, the foregoing object can be attained by providing a gas insulated switchgear which is constructed in such a manner that each phase of each of the main busbars is disposed on each of the vertexes of a triangle, and the axes of disconnectors corresponding to three phases and disconnector movable side conductors corresponding to three phases are arranged between one phase of the main busbar and the other two phases of the main busbar so that the axes of the busbar disconnectors become parallel with each other. The movable side conductors and the main busbars are connected to each other.

Because the gas insulated switchgear of the present invention is constructed as described above, the portion between electrodes of the busbar disconnector can be arranged in the vicinity of the central axis of the main busbar. Further, it is possible to directly connect the busbar disconnector to a vertically shaped circuit breaker, since the axis of the busbar disconnector is horizontal. Furthermore, as in the case of the conventional art, because it becomes unnecessary to connect the disconnector having the vertical axis to the circuit breaker after the vertical axis of the disconnector is shifted in a horizontal direction, it is possible to simplify the shapes of the sealed vessels, the connecting conductors, etc., to miniaturize the entire gas insulated switchgear, and further to reduce the floor area required for installing the switchgear.

Other features will become apparent from the following Description of the Preferred Embodiments when read with reference to the accompanying drawings.

DESCRIPTION OF THE PREFERRED EMBODIMENTS

An embodiment of a gas insulated switchgear according to the present invention will be hereinafter described in detail with reference to the accompanying drawings.

Figure 1:
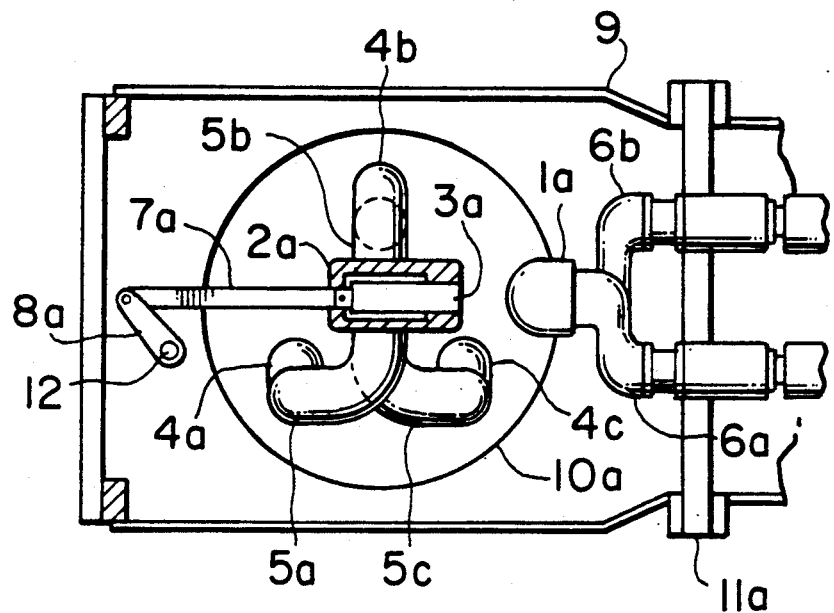
FIG. 1 is a longitudinal section of an embodiment according to the present invention, which illustrates the main portion of a gas insulated switchgear.
Figure 2:
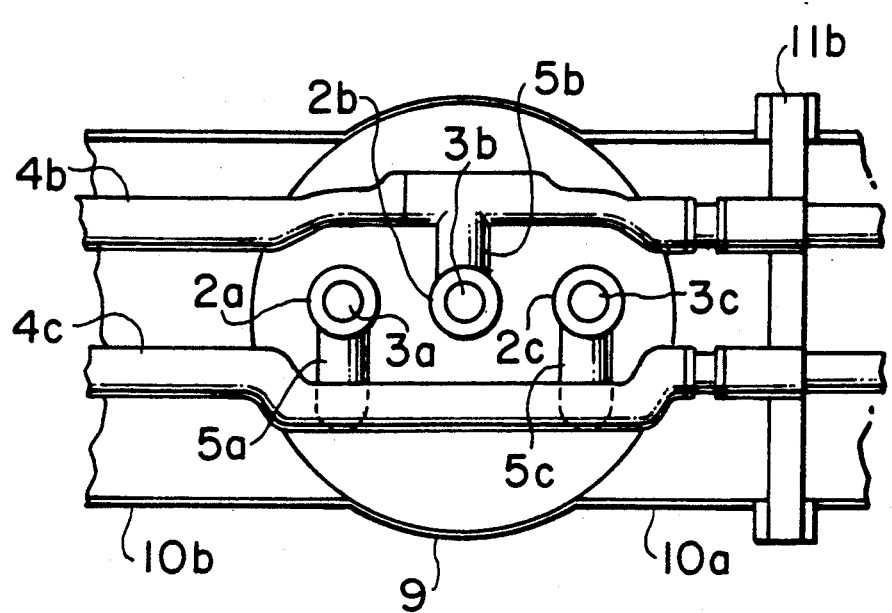
FIG. 2 is a cross-sectional view from the side of the disconnector fixed contacts as illustrated in FIG. 1, which shows the connection between the disconnector moving contacts and the main busbar conductors.
Figure 3:
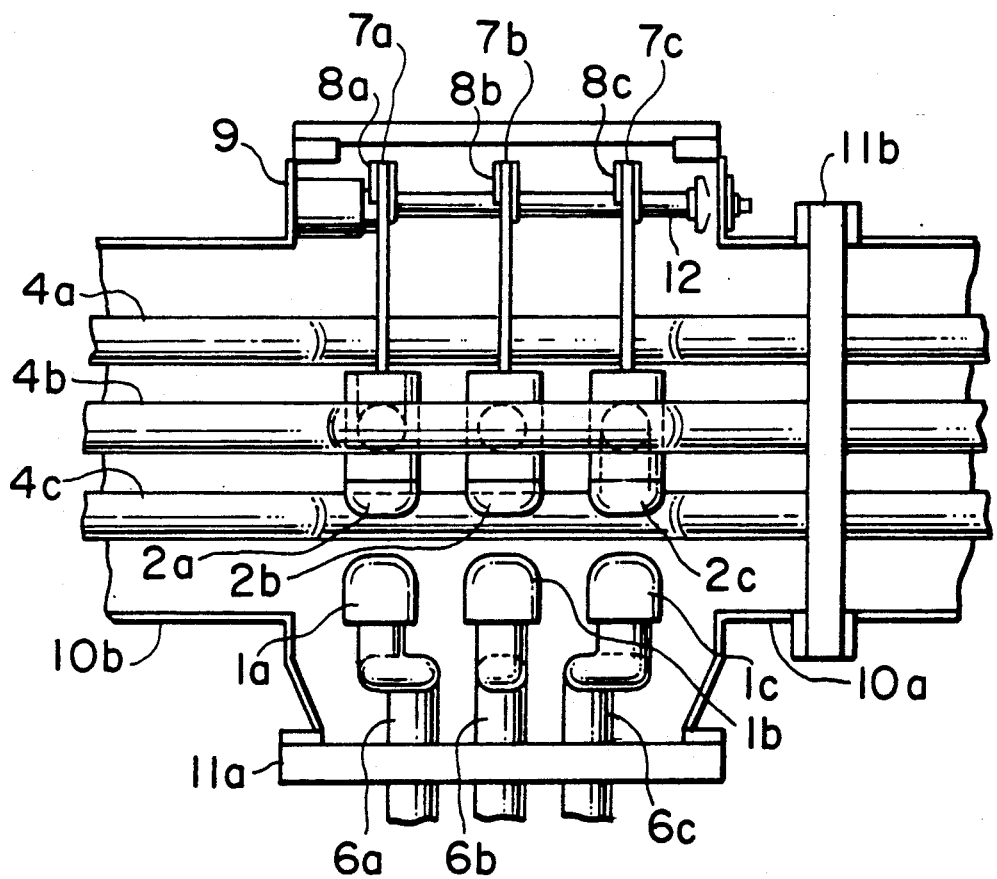
FIG. 3 is a plan view of FIG. 1.

In FIGS. 1 through 3, reference characters 1a through 1c denote disconnector fixed contacts; reference characters 2a through 2c denote disconnector movable side conductors; reference characters 3a through 3c denote disconnector moving contacts; 4a through 4c denote main busbar conductors; 5a through 5c denote connecting conductors; 6a through 6c denote disconnector connecting conductors; 7a through 7c denote insulation operating rods; 8a through 8c denote operating levers; 9 denote a sealed vessel; 10a, 10b denote branch pipes; and 11a, 11b denote insulation supporting spacers.

An embodiment of the present invention shown in FIGS. 1 through 3 illustrates the structure of the portion where the main busbar disconnector of the gas insulated switchgear is housed. The sealed vessel 9 housing the disconnector is connected to other sealed vessels through the branch pipes 10a, 10b which are substantially at right angles with the sealed vessel 9. The main busbar conductors 4a through 4c are housed in the sealed vessel a supported by the branch pipes 10a, 10b, and the disconnector connecting conductors 6a through 6c housed in the sealed vessel 9 are connected to an circuit breaker (not shown) or the like.

A three-phase disconnector is arranged in the following construction inside the sealed vessel 9 described above.

The main busbar conductor 4b of a middle phase in the branch pipes 10a, 10b is arranged on the upper side of the sealed vessel 9, and the main busbar conductors 4a, 4c of an outer phase in the branch pipes 10a, 10b are arranged on the lower side of the sealed vessel 9 so that the main busbar conductors 4a through 4c are respectively disposed on each vertex of a triangle. Further, the disconnector movable side conductors 2a through 2c in the sealed vessel 9 are arranged horizontally parallel with each other so as to be substantially in the same positions as those of the main busbar conductors, as viewed in the axial directions of the main busbar conductors. Furthermore, the disconnector movable side conductors 2a through 2c are arranged on the lower side of the main busbar conductor 4b and on the upper side of the main busbar conductors 4a, 4c so as to be disposed between the upper and lower sides. The disconnector movable side conductors 2a through 2c are connected to the main busbar conductors 4a through 4c by the connecting conductors 5a through 5c.

Furthermore, the disconnector fixed contacts 1a through 1c, facing the disconnector movable side conductors 2a through 2c, are arranged horizontally parallel with each other so as to be substantially in the same positions as those of the main busbar conductors, as viewed in the axial directions of the main busbar conductors. The disconnector fixed contacts 1a through 1c are connected by the disconnector connecting conductors 6a through 6c, through conductors built in the insulation supporting spacer 11a, to an unillustrated circuit breaker. The insulation supporting spacer 11a is disposed perpendicular to the axis of the disconnector. The conductors built in the insulation supporting spacer 11a are arranged such that one of the conductors of a middle phase is disposed on the upper side of a plane which includes three parallel axes of the disconnector fixed contacts 1a through 1c, and the other two conductors of outer phase are disposed on the lower side of the plane so that the three conductors are respectively arranged on each vertex of a triangle. The positions of the disconnector fixed contacts 1a through 1c and the built-in conductors are determined so that the distances from the disconnector fixed contacts 1a through 1c of the phases to the built-in conductors corresponding to the phases are substantially equal to each other. For these reasons, the disconnector connecting conductors 6a through 6c can have the same shape.

The disconnector moving contacts 3a through 3c, which correspond to three phases, bridging between the above disconnector movable side conductors 2a through 2c and the disconnector fixed contacts 1a through 1c, are arranged substantially horizontally parallel with each other in the same manner as that described above. The disconnector moving contacts 3a through 3c are linked, through the insulation operating rods 7a through 7c and the operating levers 8a through 8c respectively, to a common operating shaft 12 for the disconnectors. The insulation operating rods 7a through 7c and the operating levers 8a through 8c are disposed in an end portion opposite to the end portion in which the disconnector fixed contacts 1a through 1c of the sealed vessel 9 are arranged.

The operating shaft 12 for the disconnectors is also arranged in a substantially horizontal position. Therefore, the disconnector fixed contacts 1a through 1c, the disconnector movable conductors 2a through 2c, and the disconnector moving contacts 3a through 3c, each of three types of the above components having three phases, are arranged in horizontal lines substantially parallel with the operating shaft 12 for the disconnectors, and are arranged among the phases of the main busbar conductors 4a through 4c.

It is possible for the above-described embodiment of the present invention to simplify the structure of the components and to reduce the size of the sealed vessel 9.

In the embodiment described above, each of the main busbar conductors 4a through 4c is made to extend outward in the sealed vessel 9 so as to extend the distances among phase conductors. That is, in this embodiment, the main busbar conductor 4b is arranged upward, whereas the main busbar conductors 4a, 4c are arranged downward, shifting away from the center. Further, to secure an insulating distance between the inner face of the sealed vessel 9 and the main busbar conductors 4a through 4c, which are disposed with extended distances among them, as described above, the sealed vessel 9 is so constructed that its inside diameter is larger than the diameters of the branch pipes 10a, 10b.

Figure 4:
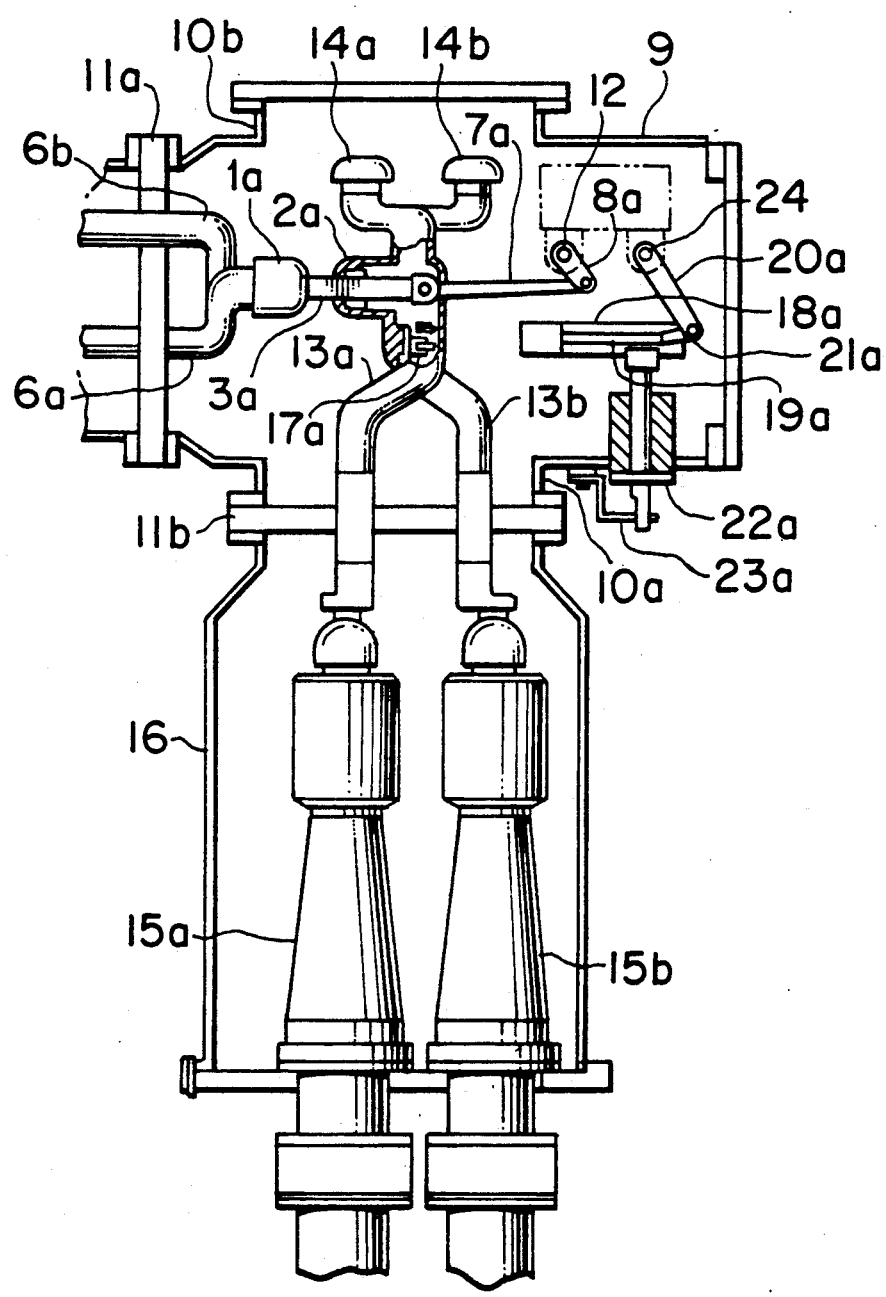
FIG. 4 is a sectional view of another embodiment according to the present invention, illustrating the main portion of the gas insulated switchgear.

FIG. 4 is a sectional view of another embodiment according to the present invention, illustrating the main portion of the gas insulated switchgear. In FIG. 4, reference characters 13a, 13b designate connecting conductors; reference characters 14a, 14b designate terminal conductors; 15a, 15b designate cable heads; 16 designate a container housing the cable heads; 17a designate a grounding switch fixed contact; 18a designate a grounding switch movable side conductor; 19a designate a grounding switch moving contact; 20a designate an operating lever; 21a 22a designate insulators; 23a designate a grounding conductor; and 24 designate an operating shaft for grounding switches, and other reference characters are the same as those in FIGS. 1 through 3.

As compared with the first embodiment in which the axis of the disconnector and the axes of the main busbar conductors are horizontal, the embodiment illustrated in FIG. 4 is one in which instead of the main busbar conductors, a transmission line side conductor having a perpendicular axis is connected to the disconnector, and a grounding switch which includes the grounding switch moving contact supported by the grounding switch fixed contact and the grounding switch movable side conductor, are provided in the lower part of the disconnector.

In FIG. 4, the disconnectors are housed in the sealed vessel 9 having the branch pipe 10b so that the disconnectors corresponding to three phases are arranged horizontally and in a same plane. FIG. 4 illustrates the disconnector in which only one phase of the disconnector fixed contact 1a, one phase of the disconnector movable side conductor 2a, and one phase of the disconnector moving contact 3a are shown.

In this embodiment, the cable heads 15a, 15b, and another one phase cable head (not shown), each of which has a substantially perpendicular axis and is disposed on each vertex of a triangle, are respectively connected, through the insulation supporting spacer 11b, to the connecting conductors 13a, 13band an one phase connecting conductor (not shown).

The positions in which these connecting conductors are respectively disposed on vertexes of a triangle are shifted to positions where they are arranged substantially parallel with each other, and then the connecting conductors are respectively connected to the disconnector movable side conductor 2a and two phase disconnector movable side conductors (not shown).

On the other hand, on the side of the branch pipe 10b, the terminal conductors 14a, 14b, and an one phase terminal conductor (not shown) are respectively disposed on vertexes of a triangle. The positions of the ends of these terminal conductors corresponding to three phases are shifted to positions where they are arranged parallel with each other, and are respectively connected to the disconnector movable side conductor 2a and two phase disconnector movable side conductors (now shown).

Furthermore, the grounding switches corresponding to three phases are arranged in the sealed vessel 9. FIG. 4 shows one grounding switch corresponding to only one phase, and this grounding switch includes the grounding switch fixed contact 17a electrically connected to the disconnector movable side conductor 2a, the grounding switch moving contact 19a which is opposite to the grounding switch fixed contact 17a and which comes in and out of contact with the grounding switch fixed contact 17a, and the grounding switch movable side conductor 18a for retaining the grounding switch moving contact 19a in its conductor.

The grounding switch moving contact 19a is linked to the operating lever 20a through an insulator 21a. The operating lever 20a is linked to the operating shaft 24 for the grounding switches which is disposed parallel with the operating shaft 12 for the disconnectors, and is guided by the electrically connected grounding switch movable side conductor 18a. The grounding switch movable side conductor 18a is led out of the sealed vessel 9 via an insulator 22a while it is electrically insulated, and is then grounded through the grounding conductor 23a and the sealed vessel 9.

The other two grounding switches, which correspond to two phases and which are not shown, are constructed as described above. The grounding switch moving contacts corresponding to three phases and the grounding switch fixed contacts corresponding to three phases are arranged in straight lines substantially parallel with the operating shaft 24 for the grounding switches, and are arranged in one substantially horizontal plane. Moreover, the plane in which the grounding switches are arranged is disposed so as to become substantially parallel with the plane in which the above-mentioned disconnectors are disposed.

In the above described embodiment of the present invention illustrated in FIG. 4, since in the sealed vessel 9, the disconnector movable side conductor is arranged close to the transmission line side conductor, and is also connected to the transmission line side conductor, the disconnector fixed contact side conductor can be connected to the circuit breaker, without shifting the axial direction of the disconnector by an angle of 90°.

Further, in the above-mentioned embodiment of the present invention shown in FIG. 4, the disconnectors corresponding to three phases and the grounding switches corresponding to three phases are housed in two different planes of the sealed vessel 9. The same parts of the three phases are disposed in straight lines substantially parallel with the operating shaft 12 for the disconnectors and the operating shaft 24 for the grounding switches. Because of this arrangement, only one end portion of the sealed vessel 9 is enough, and it is therefore possible to miniaturize and simplify the sealed vessel 9.

Figure 5:
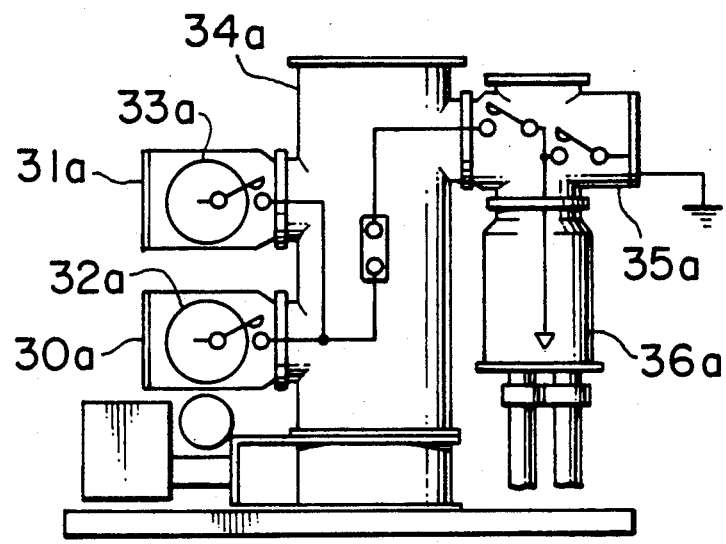
FIG. 5 is a front view showing an applied example of the present invention.
Figure 6:
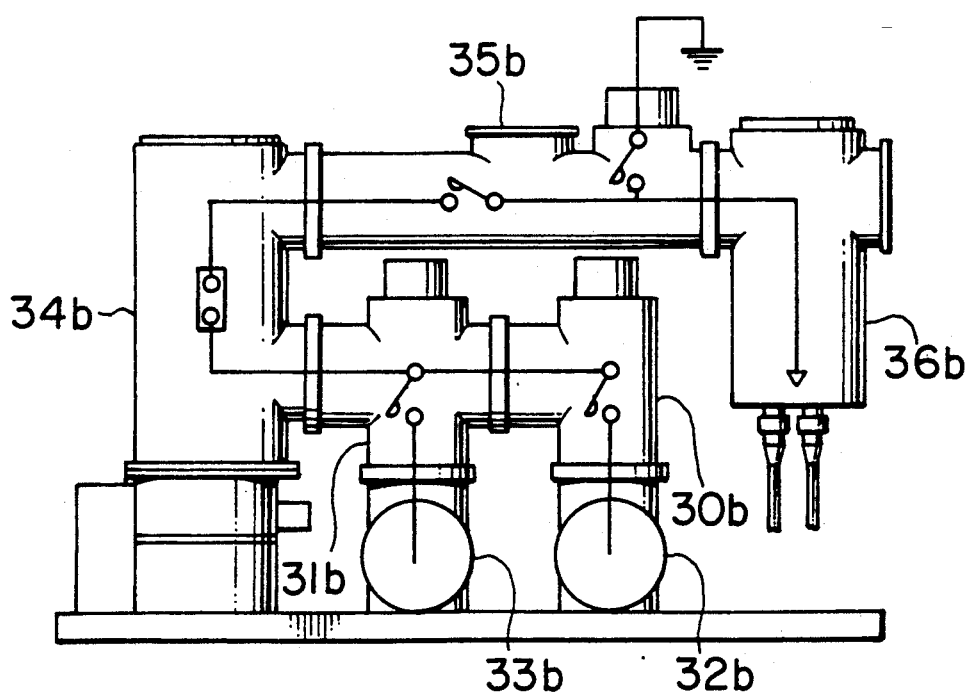
FIG. 6 is a front view showing the construction of the conventional art.

FIG. 5 is a front view, illustrating an applied example of the present invention, in which a gas insulated switchgear is constructed by using two three-phase disconnectors for the main busbars illustrated in FIG. 1 and one transmission line side disconnector shown in FIG. 4. In FIG. 5, reference characters 30a, 31a, 35a indicate disconnectors; 32a, 33a main busbars; 34a a circuit breaker; and 36a a container for housing cable heads.

As is understood from FIG. 5, in the gas insulated switchgear, because the disconnectors 30a, 31a connected to the main busbars 32a, 33a and the circuit breaker 34a are disposed in the vicinity of the main busbars 32a, 33a, and because the axes of the disconnectors 30a, 31a intersect substantially at right angles with each other with the axes of the main busbars 32a, 33a and the axis of the circuit breaker 34a, it is possible to connect the main busbars 32a, 33a to the circuit breaker 34a within the shortest possible distance in order to miniaturize the entire gas insulated switchgear, reduce the floor area required for installing the switchgear.

As has been explained, according to the present invention, the arrangement of the conductors of the main busbars or the transmission line side conductors forms a triangle. The disconnectors, corresponding to three phases and connected to these conductors, are arranged parallel with each other, and portions between the electrodes of the disconnectors are disposed immediately proximate to the main busbars or the transmission line side conductors. For these reasons, when the disconnectors are connected to the circuit breaker, they can be directly connected to the circuit breaker, without bending the axes of the connecting conductors by an angle of 90°. It is thus possible to simplify the structure of the components and to miniaturize the entire gas insulated switchgear.

The invention has been described in detail with particular reference to the preferred embodiments thereof, but it will be understood that variations and modifications of the invention can be made within the spirit and scope of the invention.

What is claimed is:

1. A gas insulated switchgear comprising a plurality of main busbar conductors and a plurality of disconnectors connected to said main busbar conductors, wherein each of said main busbar conductors is respectively arranged on a vertex of a triangle, and one of said disconnectors corresponding to one of three phases is arranged substantially parallel with another of said disconnectors in the same plane as said one of said disconnectors, each of said disconnectors being arranged between one phase of said main busbar conductors of one phase and another two phases of said main busbar conductors of another two phases.

2. A gas insulated switchgear according to claim 1, wherein each of said disconnectors includes a movable side conductor being arranged adjacent to each of central axes of said three phases of said main busbar conductors.

3. A gas insulated switchgear according to claim 2, wherein said gas insulated switch gear further comprises a sealed vessel and a branch pipe, said main busbar conductors and said disconnectors being housed in said sealed vessel, and wherein a side of one of the main busbar conductors is a portion of said branch pipe, and wherein a side of one of the disconnectors is a parental pipe, and wherein each of said main busbar conductors projects outwardly to increase a distance between the three phases in a parental pipe portion of said parental pipe.

4. A gas insulated switchgear according to claim 3, wherein said disconnectors include a plurality of connecting conductors and a plurality of fixed contacts, said connecting conductors having a plurality of end portions and being respectively connected to the fixed contacts corresponding to said three phases, said connecting conductors being parallel with each other, said fixed contacts being respectively arranged on vertexes of another triangle in a plane perpendicular to axes of said disconnectors, and wherein said end portions of the connecting conductors are arranged so that distances between said fixed contacts and the connecting conductors are substantially equal.

5. A gas insulated switchgear according to claim 2, wherein said disconnectors include a plurality of connecting conductors and a plurality of fixed contacts, said connecting conductors having a plurality of end portions and being respectively connected to the fixed contacts corresponding to said three phases, said fixed contacts being arranged parallel with each other, said fixed contacts being respectively arranged on vertexes of another triangle in another plane perpendicular to axes of said disconnectors, and wherein said end portions of the connecting conductors are arranged so that respective distances between said fixed contacts and the connecting conductors are substantially equal.

6. A gas insulated switchgear according to claim 1, wherein said gas insulated switch gear further comprises a sealed vessel and a branch pipe, each of said main busbar conductors and each of said disconnectors being housed in said sealed vessel, and wherein a side of one of the main busbar conductors is a portion of said branch pipe, and wherein a side of the one of said disconnectors is a parental pipe, and wherein each of said main busbar conductors projects outwardly to increase a distance between the phases in a parental pipe portion of said parental pipe.

7. A gas insulated switchgear according to claim 3, wherein said disconnectors include a plurality of connecting conductors and a plurality of fixed contacts, said connecting conductors having a plurality of end portions and being respectively connected to the fixed contacts corresponding to said three phases, said connecting conductors being arranged in parallel with each other, said fixed contacts being respectively arranged on vertexes of another triangle in another plane perpendicular to axes of said disconnectors, and wherein said end portions of the connecting conductors are arranged so that distances between said fixed contacts and said connecting conductors are substantially equal.

8. A gas insulated switchgear according to claim 1, wherein said disconnectors include a plurality of connecting conductors and a plurality of fixed contacts, said connecting conductors having a plurality of end portions and being respectively connected to the fixed contacts corresponding to said three phases, said connecting conductors being arranged parallel with each other, said fixed contacts being respectively arranged on vertexes of another triangle in another plane perpendicular to axes of said disconnectors, and wherein said end portions of the connecting conductors are arranged so that respective distances between said fixed contacts and said connecting conductors are substantially equal.

9. A gas insulated switchgear as in claim 1, wherein said disconnectors include fixed contact side conductors connected to a conductor of an interrupter of a circuit breaker.

10. A three-phase gas insulated switchgear comprising a plurality of transmission line side conductors, a first insulating supporter, a second insulating supporter and a plurality of disconnectors connected to said transmission line side conductors, wherein the disconnectors corresponding to three phases are disposed parallel with each other in a same plane, and wherein said disconnectors includes movable side conductors supported by said first insulating supporter arranged on a side of the three-phase gas insulated switchgear substantially perpendicular to axes of said disconnectors, and a side of a fixed contact of said disconnectors is supported by said second insulating supporter arranged on the side where axes of said disconnectors project, and wherein said transmission line side conductors are connected to the movable side conductors of said disconnectors.

11. A three phase gas insulated switchgear according to claim 10, wherein said transmission line side conductors and the disconnectors are housed in a sealed vessel having a branch opening in a direction of the projection of the axes of the transmission line side conductors.

12. A three phase gas insulated switchgear as in claim 11, wherein said disconnectors include a disconnector fixed contact side conductor connected to a conductor of an interrupter of a circuit breaker.

13. A gas insulated switchgear according to claim 11, wherein said gas insulated switchgear further comprises grounding switches constructed such that grounding switch fixed contacts of said grounding switches are connected to the moveable side conductors of said disconnectors, grounding switch moving contacts of said grounding switches which come in or out of contact with said grounding switch fixed contacts being provided in an opposite position to said grounding switch fixed contacts, and wherein said grounding switches are disposed so that the axes of said grounding switches become substantially parallel with the axes of said disconnectors.

14. A gas insulated switchgear as in claim 13, wherein said disconnectors include disconnector fixed contact side conductor of the gas insulated switchgear connected to a conductor on one side of an interrupter of a circuit breaker, and said disconnectors include a disconnector fixed contact side conductor of the gas insulated switchgear connected to a conductor on another side of the interrupter of the circuit breaker.

15. A gas insulated switchgear according to claim 10, wherein said gas insulated switchgear further comprises grounding switches constructed such that grounding switch fixed contacts of the grounding switches are connected to the movable side conductors of said disconnectors, grounding switch moving contacts of the grounding switches which can come in or out of contact with said grounding switch fixed contacts being provided in an opposite position to said grounding switch fixed contacts, and wherein said grounding switches are disposed so that the axes of said grounding switches become substantially parallel with the axes of said disconnectors.

16. A gas insulated switchgear as in claim 15, wherein said disconnectors include a disconnector fixed contact side conductor of the gas insulated switchgear connected to a conductor on one side of a interrupter of a circuit breaker, and said disconnectors include a disconnector fixed contact side conductor of the gas insulated switchgear connected to a conductor on another side of the interrupter of the circuit breaker.

17. A three phase gas insulated switchgear as in claim 10, wherein said disconnectors include a disconnector fixed contact side conductor connected to a side of an interrupter of a circuit breaker.

* * * * *